Sept. 6, 1960 J. NOORDANUS ET AL 2,951,994
TRANSISTOR OSCILLATOR
Filed March 25, 1957
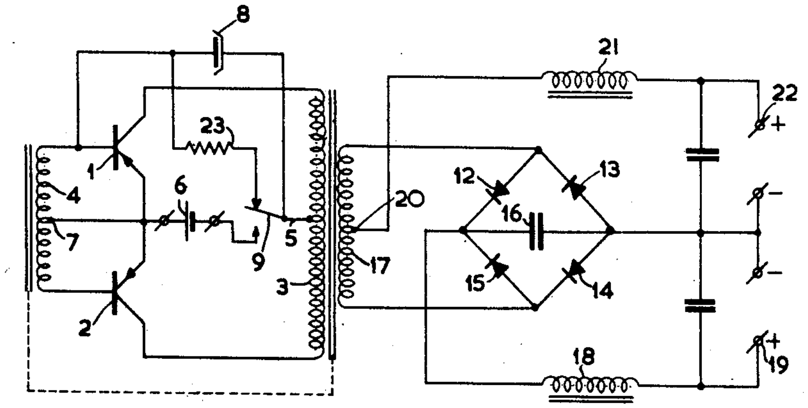
INVENTOR
JOHANNES NOORDANUS
HENDRIK VOLKERS
BY Frank R. Jeffari
AGENT United States Patent Office 2,951,994
Patented Sept. 6, 1960

2,951,994

TRANSISTOR OSCILLATOR

Johannes Noordanus and Hendrik Volkers, Hilversum, Netherlands, assignors to North American Philips Company, Inc., Irvington on Hudson, N.Y.

Filed Mar. 25, 1957, Ser. No. 648,253

Claims priority, application Germany Apr. 13, 1956

1 Claim. (Cl. 331—113)

This invention relates to an oscillator provided with two transistors and a transformer for regenerative feedback of the collector circuits of the transistors to their emitter-base circuits. Such an oscillator is used, for example, for the production of square-wave voltages, the transistors becoming conductive alternately. These voltages can be used, for example by means of full-wave rectification, to convert a low voltage into a high voltage. It has been found that the power losses in the transistors need only be a small part of the power supplied to a load to which the rectified high voltage is applied. This results in a voltage conversion of high efficiency.

In a known oscillator of this kind, the supply source for the transistors is connected between a centre tapping on the primary winding of the transformer and the interconnected bases of the transistors. The secondary of the transformer is connected between the two emitters of the transistors, a centre tap on this secondary being connected also to the bases.

This oscillator has a disadvantage in that it is difficult to achieve self-excitation, since, when the supply source is switched into circuit comparatively small currents flow to the collectors of the transistors, which currents moreover produce voltages in the primary of the transformer which partly balance each other, so that only a very low feedback voltage is produced in the secondary. These collector currents can be materially increased by connecting a bias supply between the emitters and bases. However, this renders the circuit arrangement more complicated, reduces the efficiency and increases the risk of overloading the transistors, since the partial balance of the two primary voltages persists, so that the oscillator can only be caused to oscillate by accidental differences in the transistor characteristics. The inclusion of additional resistances in one of the transistor electrode circuits would also materially reduce the efficiency.

It is an object of the invention to provide a better solution with slight changes in the circuit arrangement. The invention is characterized in that, in order to excite the oscillations, one terminal of the transistor supply source is connected through secondary windings of the transformer to the transistor bases, the other terminal being connected, through a capacitor, to one of these bases, so that when the supply source is switched in, a current pulse initiating the start of oscillations is supplied to the last-mentioned base through this capacitor.

In order that the invention may readily be carried into effect, one embodiment thereof will now be described, by way of example, with reference to the accompanying diagrammatic drawing.

The oscillator is provided with two transistors 1 and 2 and a transformer 3—4—17, the primary 3 of which is connected in the collector circuits whilst the secondary 4 is connected in the emitter-base circuits of the transistors 1 and 2. A centre tapping 5 on this primary 3 is connected, through a supply source 6, to the two emitters and a centre tape 7 and, through the two halves of the secondary 4, to the bases of the transistors 1 and 2 respectively.

In order to excite oscillation, a capacitor 8 is connected between the tap 5 and the base of the transistor 1. When the supply source 6 is switched in by means of a switch 9, a current pulse is supplied through a capacitor 8 to the base of the transistor 1, so that this transistor is rendered conductive and between its emitter and collector a current flows of such value that in the upper half of the primary 3 a voltage is produced which is approximately equal to the voltage of the supply source 6. This voltage produces in the secondary 4 a feedback voltage which renders the transistors 1 more conductive and cuts off the transistor 2.

Owing to a non-linearity of the transformer-transistor combination 1—3 the current flowing through this transistor falls off suddenly, so that the feedback voltage produced is decreased and the transistor 1 is completely cut off. This produces, across the windings 3 and 4, a sudden voltage change which renders the transistor 2 conductive, and so on.

Thus, the transistors 1 and 2 become conductive alternately and produce a square-wave voltage across the windings 3 and 4. By fullwave rectification of this square-wave voltage by means of rectifiers 12—13—14—15, across a smoothing capacitor 16 a voltage is produced which, with a suitable number of turns of the tertiary winding 17 of the transformer 3—4, can materially exceed the voltage from the source 6 and is supplied to an output terminal 19 through a choke coil 18. One half of this voltage is set up at a tapping 20 on the winding 17 and supplied through a choke coil 21 to the output terminal 22. A resistor 23 acts to discharge the capacitor 8 when the switch 9 is in its inoperative position. Good results are achieved with transistors 1 and 2 of the type OC 15, a transformer having 64 primary turns, 8 secondary turns and 880 tertiary turns and capacitors 8 and 16 of 250 and 0.033 $\mu$f. respectively. With these values of the components, a supply voltage of 6 volts is converted into an output voltage of 140 volts and 70 volts respectively. The operating frequency is about 900 c./s. and the output power is about 6 watts.

What is claimed is:

A transistor oscillator comprising two transistors each having a base electrode, an emitter electrode and a collector electrode, a transformer having a first center-tapped winding interconnecting said base electrodes and forming an input circuit with said base electrodes, said transformer having a center-tapped second winding interconnecting said collector electrodes and being coupled to said input circuit in positive feed-back relationship, a source of D.C. power supply having two terminals, one terminal of said source being connected to the center tap of said first winding, said emitter electrodes being directly connected to the junction of said one terminal and said center tap, a capacitor connected between the center tap of said second winding and the base electrode of one of said transistors, and a switch interconnecting the second terminal of said source to the junction of said capacitor and the center-tap of said second winding, said switch having two positions, in one of which a direct connection is provided between said junction and said second terminal and in the other of which said center tap of the second winding is connected to the base electrode of said one transistor through a series resistor.

References Cited in the file of this patent

UNITED STATES PATENTS

| | | |
|---|---|---|
| 2,748,274 | Pearlman | May 29, 1956 |
| 2,783,384 | Bright et al. | Feb. 26, 1957 |
| 2,843,744 | Guyton | July 15, 1958 |